US007097111B2

(12) United States Patent
Riley et al.

(10) Patent No.: US 7,097,111 B2
(45) Date of Patent: Aug. 29, 2006

(54) ENVIRONMENTAL CONTROL SYSTEM AND METHOD FOR STORAGE BUILDINGS

(75) Inventors: William P. Riley, Plainwell, MI (US); William P. Riley, II, Plainwell, MI (US)

(73) Assignee: Gun Valley Temperature Controls LLC, Plainwell, MI (US)

( * ) Notice: Subject to any disclaimer, the term of this patent is extended or adjusted under 35 U.S.C. 154(b) by 441 days.

(21) Appl. No.: 10/271,824

(22) Filed: Oct. 15, 2002

(65) Prior Publication Data

US 2003/0029925 A1 Feb. 13, 2003

Related U.S. Application Data

(63) Continuation-in-part of application No. 09/621,509, filed on Jul. 21, 2000, now Pat. No. 6,467,695.

(51) Int. Cl.
*F24F 7/00* (2006.01)

(52) U.S. Cl. .......................... 236/49.3; 62/332; 62/411; 62/78

(58) Field of Classification Search ................ 236/49.3, 236/DIG. 9; 62/56, 441, 186, 332, 411, 78; 454/175, 177; 318/471
See application file for complete search history.

(56) References Cited

U.S. PATENT DOCUMENTS

| 3,418,914 | A | | 12/1968 | Finkin |
| 3,801,888 | A | | 4/1974 | Faulkner |
| 3,896,359 | A | | 7/1975 | Olander et al. |
| 4,113,175 | A | | 9/1978 | Sutton, Jr. |
| 4,136,822 | A | | 1/1979 | Felter |
| 4,250,716 | A | | 2/1981 | Huffman |
| 4,251,026 | A | * | 2/1981 | Siegel et al. ............... 236/49.3 |

(Continued)

*Primary Examiner*—Fadi H. Dahbour
(74) *Attorney, Agent, or Firm*—TraskBritt

(57) ABSTRACT

A method and system for controlling the environment of storage facilities, including produce and livestock storage facilities, and the like, is described. Movement of air within the facility is accomplished by air-handling units or fans. The speed of each fan is controlled by a variable-speed drive, allowing the fans to run at speeds below full capacity. Environmental parameters, such as temperature or humidity, are monitored to determine the existing state of the environment which is then compared to a desired state. The speed of the fans or air-handling units is adjusted to alter the existing environmental state, bringing it in alignment with the desired state. The fans or air-handling units are operated continuously, typically at reduced capacity. Other various facets are included with the system and method, including the control of the admittance of external air into the storage facility.

29 Claims, 6 Drawing Sheets

U.S. PATENT DOCUMENTS

| | | | |
|---|---|---|---|
| 4,257,238 A | | 3/1981 | Kountz et al. |
| 4,299,092 A | | 11/1981 | Ibrahim |
| 4,389,853 A | | 6/1983 | Hile |
| 4,493,194 A | | 1/1985 | Briccetti |
| 4,506,199 A | | 3/1985 | Asche |
| 4,553,584 A | | 11/1985 | Bloomquist |
| 4,619,114 A | | 10/1986 | Wilson |
| 4,648,551 A | | 3/1987 | Thompson et al. |
| 4,659,290 A | * | 4/1987 | Kundert ............ 236/DIG. 9 |
| 4,682,473 A | | 7/1987 | Rogers, III |
| 4,754,697 A | * | 7/1988 | Asselbergs ............ 236/49.3 |
| 4,773,587 A | | 9/1988 | Lipman |
| 4,806,832 A | | 2/1989 | Muller |
| 4,809,593 A | * | 3/1989 | Asselbergs ............ 236/49.3 |
| 4,941,325 A | | 7/1990 | Nuding |
| 4,942,921 A | | 7/1990 | Haessig et al. |
| 4,993,629 A | | 2/1991 | Wylie |
| 5,000,381 A | * | 3/1991 | Mueller et al. ............ 236/49.3 |
| 5,065,593 A | | 11/1991 | Dudley et al. |
| 5,102,040 A | | 4/1992 | Harvey |
| 5,125,571 A | | 6/1992 | Heber |
| 5,170,935 A | | 12/1992 | Federspiel et al. |
| 5,197,667 A | | 3/1993 | Bowsky et al. |
| 5,234,050 A | | 8/1993 | Weigert |
| 5,255,529 A | | 10/1993 | Powell et al. |
| 5,292,280 A | | 3/1994 | Janu et al. |
| 5,336,131 A | | 8/1994 | Crider et al. |
| 5,364,026 A | | 11/1994 | Kundert |
| 5,410,230 A | | 4/1995 | Bessler et al. |
| 5,413,165 A | | 5/1995 | Wylie |
| 5,449,275 A | | 9/1995 | Gluszek et al. |
| 5,489,238 A | * | 2/1996 | Asselbergs ............ 236/49.3 |
| 5,491,649 A | | 2/1996 | Friday, Jr. et al. |
| 5,492,273 A | | 2/1996 | Shah |
| 5,497,629 A | | 3/1996 | Rafalovich et al. |
| 5,544,809 A | | 8/1996 | Keating et al. |
| 5,547,125 A | | 8/1996 | Hennessee et al. |
| 5,707,005 A | | 1/1998 | Kettler et al. |
| 5,711,159 A | | 1/1998 | Whipple, III |
| 5,769,314 A | | 6/1998 | Drees et al. |
| 5,847,526 A | | 12/1998 | Lasko et al. |
| 5,971,067 A | | 10/1999 | Rayburn et al. |
| 6,037,732 A | | 3/2000 | Alfano et al. |
| 6,040,668 A | | 3/2000 | Huynh et al. |
| 6,079,627 A | | 6/2000 | Kettler |
| 6,188,189 B1 | | 2/2001 | Blake |
| 6,230,980 B1 | | 5/2001 | Hudson |
| 6,386,460 B1 | | 5/2002 | Riley et al. |
| 6,467,695 B1 | | 10/2002 | Riley et al. |
| 6,467,696 B1 | | 10/2002 | Riley et al. |
| 6,481,635 B1 | | 11/2002 | Riley et al. |

* cited by examiner

ENVIRONMENTAL CONTROL SYSTEM AND METHOD FOR STORAGE BUILDINGS

CROSS-REFERENCE TO RELATED APPLICATION

This application is a continuation-in-part of U.S. application Ser. No. 09/621,509, filed Jul. 21, 2000, now U.S. Pat. No. 6,467,695 B1, which issued Oct. 22, 2002.

BACKGROUND OF THE INVENTION

1. Field of the Invention

The present invention relates generally to environmental control of storage buildings and facilities. More particularly, the present invention relates to the control of such parameters as temperature, humidity, and carbon dioxide ($CO_2$) within a storage facility wherein produce or like commodities are stored.

2. State of the Art

Produce providers often desire to store fruits and vegetables for extended periods of time. Produce is often stored to maintain adequate supplies during periods when a particular commodity is out of season. Processors of fruit and vegetables increasingly desire commercial growers to store their products for longer and longer periods of time. Indeed, processors require a year-round supply of produce while requiring that the quality of such produce remain high.

To store produce for extended periods of time without substantial degradation of quality, it becomes imperative to control the environment in which the produce is stored. Control of the storage facility environment may include the control of, for example, temperature, humidity, and air quality including carbon dioxide ($CO_2$) content. Typically, control of such parameters in a storage facility environment entails movement of air within the facility. Oftentimes, this includes introduction of air from outside the facility. Other times it may simply involve the circulation of existing air inside the storage facility.

One method of controlling the environment has been to place fans or air-handling units in the facility. The fans may be turned on when the temperature rises above a predetermined upper level and shut off when the temperature of the facility reaches a predetermined lower level. A system of this type is described in U.S. Pat. No. 3,801,888 to Faulkner. This type of system utilizes the fans at full power, allowing them to cool the facility at a relatively quick pace, but also allowing temperatures or other environmental parameters to change rapidly within a specified range. Rapid changes in temperature or temperature spikes may often cause a temperature-induced shock to the stored inventory, ultimately resulting in quality degradation. Similarly, rapid changes in other environmental parameters may degrade the quality of the stored commodity.

Some systems have sought to utilize multi-speed fans such as is described in U.S. Pat. No. 3,896,359 to Olander et al. Such a system is implemented with the desire of allowing temperature or other environmental changes to take place at a slower rate. However, even these systems do not allow the desired flexibility in controlling a chosen environmental parameter within the storage facility. Such systems employ low- and high-speed control of the fan or air-handling unit. While this allows for a stepped transition from one temperature to another, it simply reduces the magnitude of any temperature spike rather than providing a continuous control of temperature within the storage facility. This is because the high- and low-speed settings each correspond to a defined range of operability. Thus, for example, in controlling temperature, the fans will remain inoperative if the temperature of the facility is within a defined temperature range. The fans will then operate at a low-speed setting once the temperature increases into a second defined range. Finally, the fans will operate at a high-speed setting if the temperature increases into a third defined range. The process will reverse itself as the temperature decreases. However, the ranges cannot be defined too tightly, otherwise the fan will be constantly starting and stopping as the temperature fluctuates between the first and second range. On the other hand, the defined ranges may not be set too broadly. If the ranges are too broad, then the temperature will increase to the point where the fans will be operating at the high-speed setting for extended periods of time in an attempt to bring the temperature back to an acceptable value. Also, depending on the commodity being stored, broad parameter ranges may simply not be acceptable from a quality standpoint.

Another important consideration in the environmental control of a storage facility is the efficient use of power. With most systems relying on fans that are cycled between on and off positions, or those systems having high/low-speed settings, power consumption is of paramount concern to the facility operator. Storing commodities for extended periods of time requires a significant consumption of power with existing systems and methods. The cost of such power, while initially resting with the facility operator, ultimately gets passed along to the consumer in the form of higher prices at the market. Thus, an efficient and accurate environmental control system for storage facilities would be of benefit to more than just the facility operator.

In view of the shortcomings in the art, it would be advantageous to provide an environmental control system for a storage facility which effectively controls specified environmental parameters while consuming a reduced amount of energy. Such a system or method should be simple to employ in existing as well as new storage facilities.

BRIEF SUMMARY OF THE INVENTION

In accordance with one aspect of the invention, a method is provided for controlling the internal environment of a storage facility, such as a storage bin for produce. The method includes the steps of providing a fan, or a plurality of fans, for moving the internal air of the storage facility. The fans are continuously operated within the storage facility. The fans may be operated continuously at a speed which is below their full capacity for continuous parameter control and reduced power consumption. The system monitors a parameter indicative of the internal environment of the storage facility. For example, a temperature sensor may be employed to monitor the internal temperature of the storage facility. Once the temperature has been monitored, the speed of the fans may be altered accordingly. For example, if the internal temperature needs to be reduced, then the fans may be operated at a higher rotational speed, increasing the air movement within the storage facility. Likewise, if the air temperature needs to be increased, the fan speeds will again be altered to accomplish this requirement. The same method may be applied in monitoring other parameters and changing the rate of air flow to obtain a desired value for the given parameter.

Additionally, environmental parameters outside of the storage facility may be monitored to assist in the regulation of airflow inside the storage facility. For example, outside air temperature may be monitored and compared to the desired facility temperature to determine whether outside air should be admitted into the facility via a ventilation inlet. Various restrictions may be placed on the admittance of outside air, such as prohibiting outside air into the facility if the outside temperature is above a specified maximum or below a specified minimum.

In accordance with another aspect of the present invention, a system is provided for controlling the internal environment of a storage facility. The system includes a fan or multiple fans which may be adapted to operate continuously. The fans may be operated continuously at a speed which is below their operational capacity. The fans are placed to move the internal air of the storage facility during operation. Each fan is coupled to a variable speed drive for controlling the operational speed of the fans. At least one sensor is employed to monitor one or more internal environmental parameters of the storage facility such as temperature, humidity, gas levels, or chemical levels. The sensor is coupled to an electronic control unit which is also coupled to the variable speed drive. The sensor provides a signal to the electronic control unit, the signal representing a measured value of an internal environmental parameter. The electronic control unit then provides a signal to the variable speed drive based upon the sensed parameter causing the associated fan to vary in speed accordingly.

Additional elements may be configured with the system to render greater control and flexibility. For example, sensors monitoring an external environment may be coupled to the electronic control unit to assist in determining fan speed. Ventilation inlets or outlets may also be coupled to the electronic control unit for controlling flow of air into and out of the facility, respectively.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
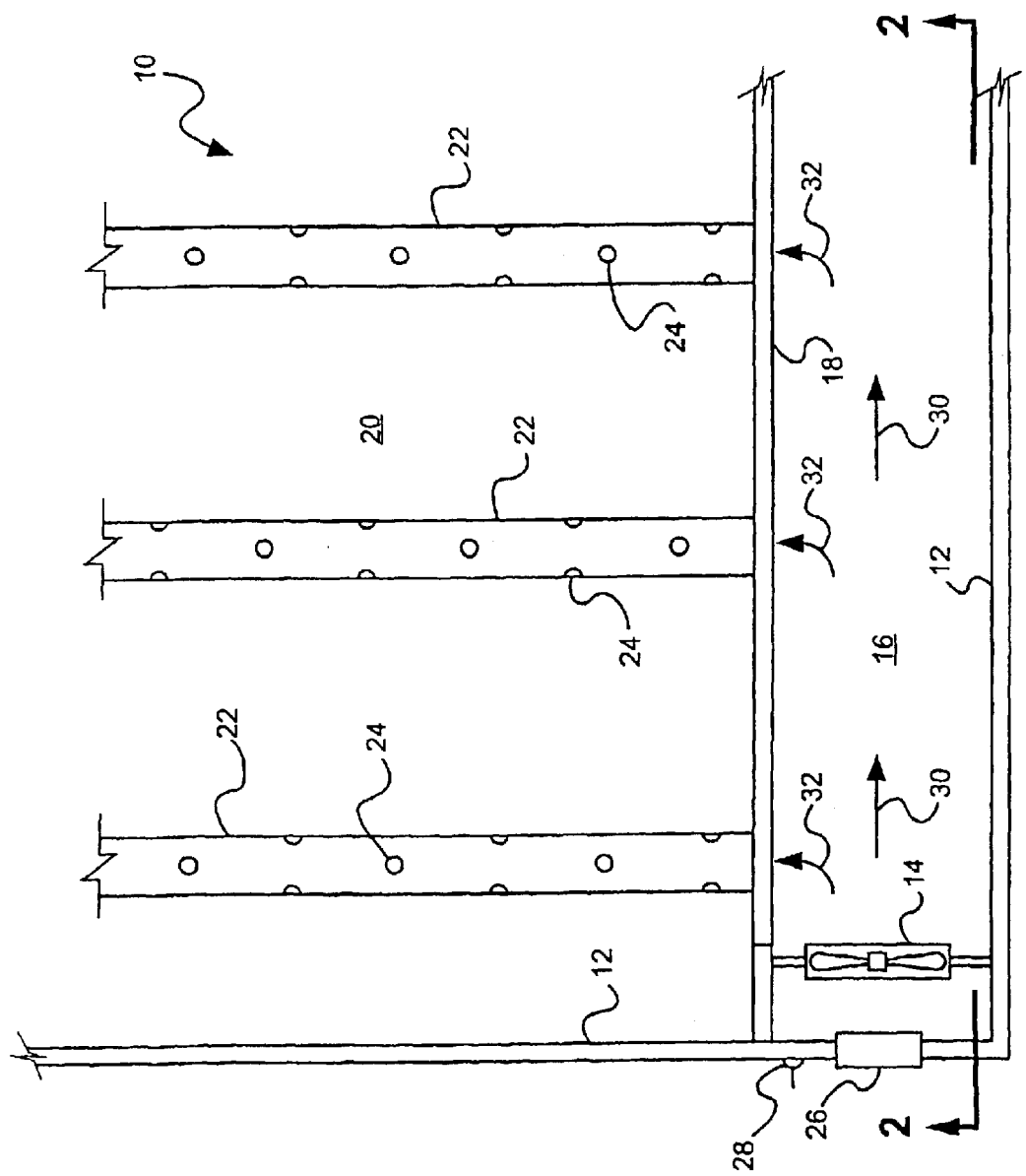
FIG. 1 is a plan view of a storage facility in accordance with certain aspects of the present invention.

Referring to FIG. 1, a storage facility 10 implementing an environmental control system according to a particular embodiment of the invention is depicted in plan view. The storage facility includes exterior walls 12 which separate the storage facility from an external environment. A fan 14, which may be a simple industrial sized fan or any other type of air-handling unit suitable for use in such a facility, is housed at one end of a main air duct 16 or plenum. An interior wall 18 serves as a barrier between the main air duct 16 and a storage area 20, also referred to herein as the storage bin 20. A series of secondary or lateral air ducts 22 pass through the interior wall 18 from the main air duct 16 to the storage bin 20. Each lateral air duct 22 includes a plurality of vents or openings 24 which allow for distribution of air throughout the storage bin 20.

A ventilation inlet 26 is located in an exterior wall 12 near the fan 14. The ventilation inlet 26 allows for external air to be introduced into the main air duct 16 when desirable. An outside sensor 28 is located external to the facility 10 to monitor a defined environmental parameter. For example, the temperature or humidity of the external air may be monitored to determine the suitability of external air and the desirability of admitting such air. It is contemplated that one or more sensor(s) may be used in such a facility to monitor various external environmental parameters.

Generally, airflow is induced by the fan 14 and travels down the main air duct 16 as indicated by directional arrows 30. Airflow then continues into the lateral air ducts 22 as indicated by directional arrows 32 and into the storage bin 20 through the ventilation openings 24 of the lateral air ducts 22. The air may then be exhausted through ventilation outlets or returned to the main air duct 16 as more fully described below. The airflow provided by the fan 14 is used to control the internal environment of the storage bin 20. The circulation of air, including the recirculation of internal air or the introduction of external air and exhausting of internal air, when necessary, can be controlled to manipulate various internal environmental parameters. Such parameters may include, for example, temperature, humidity or $CO_2$ content of the facility.

Figure 2:
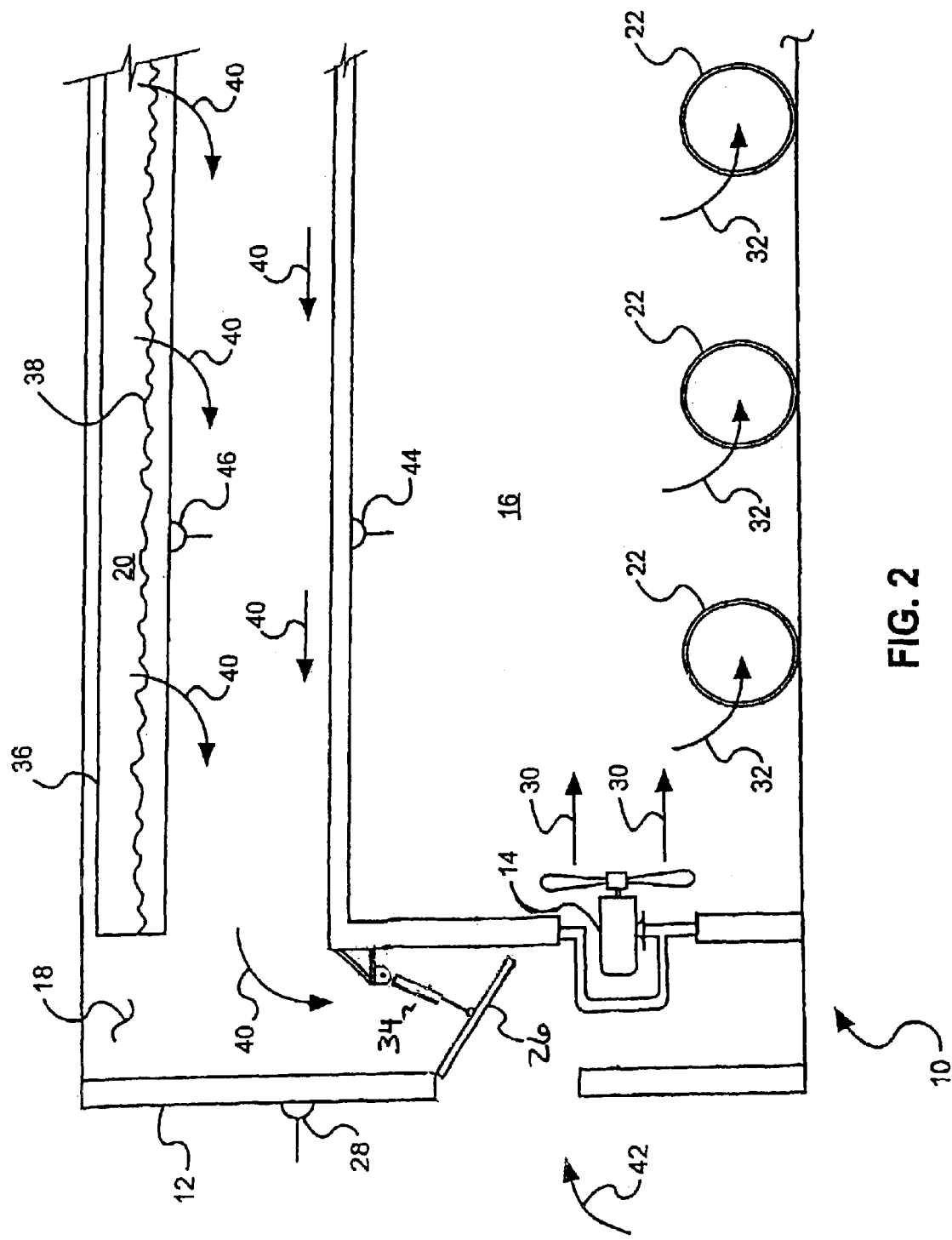
FIG. 2 is an elevational view of the storage facility of FIG. 1 taken along the section line 2—2.

Referring now to FIG. 2, an elevational view of the facility 10 is depicted as indicated by sectional line 2—2 of FIG. 1. The ventilation inlet 26 is shown to be adjusted by an actuator 34. The ventilation inlet 26 is shown to be a hinged door or hatch actuated by a hydraulic or pneumatic cylinder. The configuration as shown, with the inlet 26 swinging inwardly, allows the inlet 26, when closed, to permit only the recirculation of air from within the facility, as depicted by directional arrow 40. When the inlet is open only external air is introduced into the main air duct 16 as indicated by directional arrow 42. When the inlet 26 is positioned at an intermediate position, a mixture of recirculated air and external air is introduced into the main air duct 16. While the above-described embodiment is simple and effective for the purpose of introducing external air into the storage facility, it is to be understood that any method of creating and actuating a ventilation inlet known in the art is considered to be within the scope of the disclosed invention.

A ventilation opening 36 is formed within the interior wall 18. Through the ventilation opening 36, the upper limit of a produce pile 38 may be seen. While not shown in FIG. 1, the produce pile is located in the storage bin 20 over the lateral air ducts 22. In addition to allowing one to view the inside of the storage bin 20, the ventilation opening 36 also allows air to return from the storage bin 20 and back into the main air duct 16. Thus, when the ventilation inlet 26 is closed, air is circulated through the main air duct 16 as indicated at 30, through the lateral air ducts 22 as indicated at 32, up through the produce pile 38, and through the ventilation opening 36 back to the main air duct 16 as indicated by directional arrows 40. Alternatively, adjustable vents/louvers may be placed over the ventilation opening 36 to help control recirculation.

When the ventilation inlet 26 is fully opened, external air only is allowed into the main air duct 16 as indicated by directional arrow 42. When the door is in the midway position, the external air combines with the recirculated air to create a mixed flow. During external air or mixed flow operation, it may be necessary to exhaust some of the air due to a positive pressure experienced in the storage bin 20. While not shown in either FIG. 1 or 2, an exhaust vent may be placed in an exterior wall 12 or in the ceiling of the storage bin 20 to accommodate such exhaust. While various types of vents may be utilized, an exhaust vent with gravity louvers is often sufficient. This type of vent allows air to exhaust to an external environment when a positive pressure is present on the interior of the building, while prohibiting air flow when the interior of the building experiences a negative or equilibrated pressure. The louvers thus open when an internal positive pressure is experienced and close, due to gravity, in the absence of a positive pressure.

Additional sensors 44 and 46 are shown in FIG. 2. A supply air sensor 44 is located in the main air duct 16 and allows for the monitoring of a chosen parameter of the supply air prior to its introduction into the storage bin 20. A return air sensor 46 is located near the ventilation opening 36 to similarly monitor the air as it returns from the storage bin 20. Thus, the air is monitored at various locations to assist in determining whether any adjustments need to be made. Adjustments would typically include changing the rate at which air is circulated and/or adjusting the amount of external air being introduced into the facility 10. These adjustments, and the logic of making such adjustments, will be discussed in greater detail below.

A chosen parameter may be monitored in the main air duct 16 to prevent the introduction of air having a far greater or lesser temperature (or other chosen environmental parameter) than that of the storage bin, 20. A sudden change in the temperature or other property of the air (e.g., humidity or $CO_2$ concentration) surrounding the produce may cause the quality of the produce to unacceptably deteriorate. Thus, in conjunction with monitoring the chosen parameter, the speed of fan 14 can be varied until the properties of the air in the main air duct 16 more closely match, or are within a specified range relative to, the properties of the air in storage bin 20. The ratio of external air to recirculated air may be altered using the ventilation inlet 26 to modify the environment in chamber 16. Additionally, in some applications, heating or cooling coils, or some other conditions apparatus, may be used to further adjust a selected parameter of the air in the main air duct 16 prior to its introduction into the storage bin 20.

Figure 3:
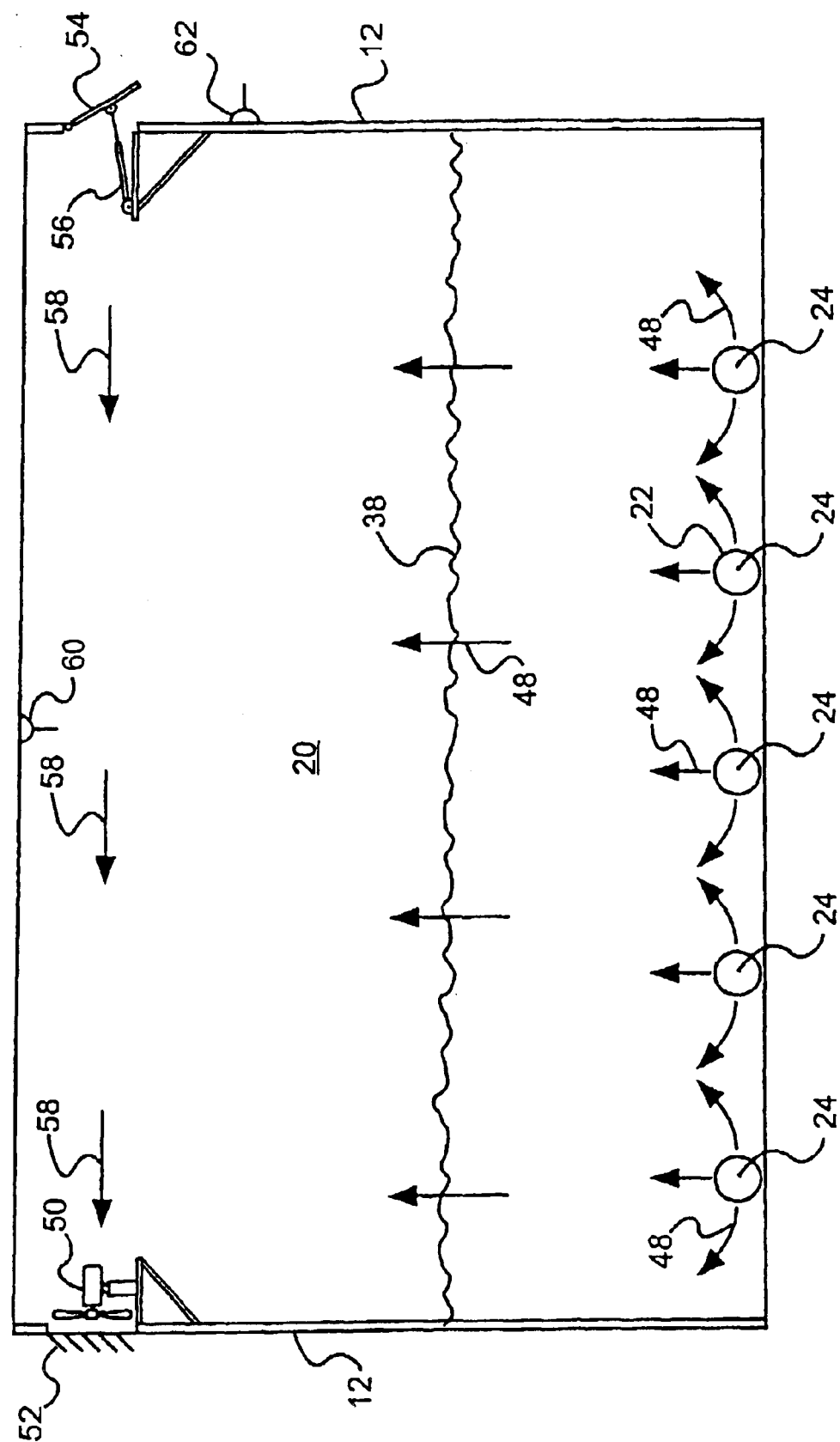
FIG. 3 is a plan view of a storage facility according to another aspect of the present invention.

Turning now to FIG. 3, a sectional plan view of the storage bin 20 is shown wherein additional components are shown and described. The produce pile 38, as described previously, sits atop the lateral air ducts 22. Air flow is directed through the ventilation openings 24 (as shown in FIG. 1) and through the produce pile as generally indicated by directional arrows 48. As described above, circulation of the air typically causes the air to return to the main air duct 16 for recirculation. However, in certain circumstances, it may be desirable to create an exchange of air by exhausting air at a more rapid pace. Such a technique would be desirable, for example, to remove air having a higher content of $CO_2$ than is desired.

An auxiliary fan 50 is placed at the upper end of the storage bin 20 near an exhaust vent 52 such as a louvered gravity vent. An auxiliary ventilation inlet 54 is located in an exterior wall 12 opposite the fan 50 and exhaust vent 52. The ventilation inlet 54 may be operated by an actuator 56, as shown, or by other suitable means, such as, for example, gravity louvers. When in operation, the auxiliary fan 50 draws external air through the ventilation inlet 54, across the storage bin 20, and out through the exhaust vent 52 as indicated by directional arrows 58. A sensor 60 is located in the storage bin to monitor a desired parameter, such as the $CO_2$. It is understood that the actual physical location of the fan 50 and associated vents 52 and 54, while typically located toward the vertical extremes of the facility, will depend on the actual layout of the storage facility in which they are employed and may be arranged in various configurations to accomplish the same or similar results.

An auxiliary system, such as that depicted in FIG. 3, assists in maintaining various internal environmental parameters when control of the main system is limited by the external environmental parameters, for example, during an extended period of time the external temperature (as measured by sensor 62) may be either too warm or too cold to open the main inlet door 26 for the introduction of fresh air. In such a case, it is still desirable to control the oxygen, carbon dioxide or other gas levels within the storage bin 20. The auxiliary system shown in FIG. 3 may be utilized to introduce just enough external air to control the gas level without unduly influencing other internal environmental parameters such as temperature or humidity. The auxiliary fan 50 and ventilation inlet 54 may be controlled simultaneously to introduce the proper amount of external air in such a situation.

Alternatively, fan 50 may be used as the primary control of the environment within the storage facility. Fan 14 may operate at a constant speed to maintain air circulation within the storage facility. Additionally, inlet 26 (FIGS. 1 and 2) need not be present, making ventilation inlet 54 (FIG. 3) the primary or sole source of external air. The speed of the fan 50 and/or the amount of external air being introduced into the storage bin 20 through ventilation inlet 54 may be adjusted to control the environment. In such a configuration, fan 14 (FIGS. 1 and 2) may be used to simply circulate the air from the storage bin 20 throughout the produce pile 38. Such a system enables control of parameters such as temperature, humidity, and carbon dioxide concentration. Determination of the needed adjustments may include consideration of external environmental parameters measured by sensor 62 and/or environmental parameters within the storage bin measured, for example, by sensor 60.

Figure 4:
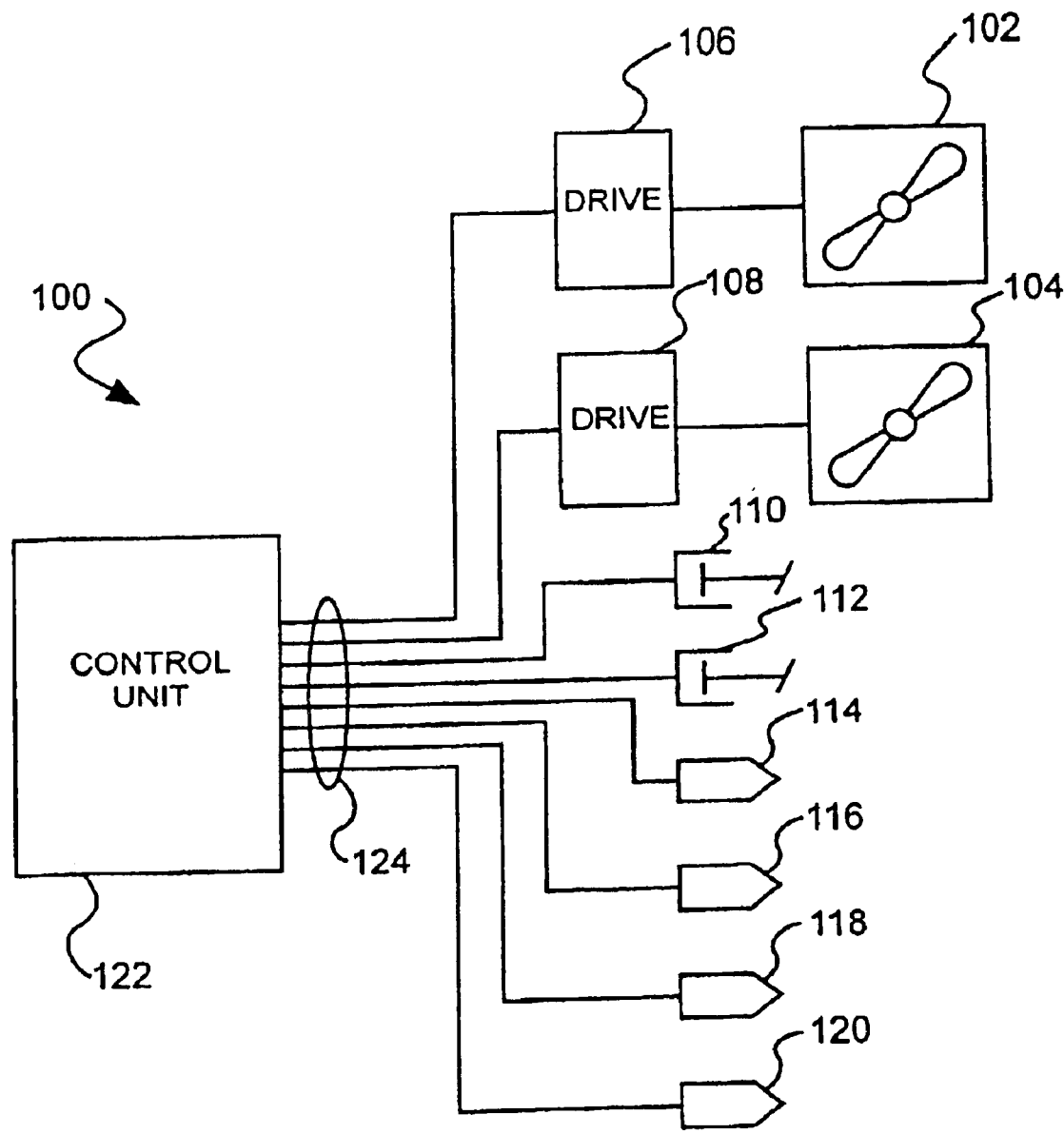
FIG. 4 is a schematic representation of an environmental control system in accordance with certain aspects of the present invention.

Referring now to FIG. 4, a schematic of the environmental control system 100 of the present technique is depicted. A first fan 102 is shown which may be taken to represent the main fan 14 located in the main air duct 16. A second fan 104 is also shown, and may be taken to represent the auxiliary fan 50 shown in FIG. 3. Each fan 102 and 104 is connected to a variable-speed drive 106 and 108, respectively. There are numerous types of variable-speed drives commercially available, each having various benefits and features. It is contemplated that the present system and method may be practiced utilizing different types of variable-speed drives for varying the rotational speed of the fans 102 and 104. For example, a variable-speed drive of the type employing a magnetic clutch would be suitable for use in the present technique. Such a drive varies the current supplied to the clutch causing the magnetic force to vary between the clutch and the shaft. This allows a certain amount of slip to occur between the shaft and the clutch. Ultimately, the rotational speed is varied by varying the amount of slip allowed in the magnetic clutch. While such a drive, and numerous others, may be suitable for use in practicing the present technique, the drives utilized in the presently disclosed embodiment are variable-frequency drives, sometimes referred to as inverter drives.

As known by those skilled in the art, a variable-frequency drive (VFD) is an electronic controller that adjusts the speed of an electric motor by modulating the power being delivered. More specifically, the speed of the electric motor is controlled by modulating the frequency of the power being supplied. The standard frequency of AC power in the United States is 60 Hz. A standard electric motor constructed for use in the United States is designed to be operated with a 60 Hz power supply. A decrease in the frequency of the power supply will result in a corresponding decrease in motor speed. For example, an electric motor that rotates at 100 rpm with a 60 Hz power supply would run at 50 rpm when the power supply is reduced to 30 Hz.

Referring still to FIG. 4, a set of actuators 110 and 112 represent the actuators 34 and 56 depicted in FIGS. 2 and 3, respectively. A plurality of sensors 114, 116, 118 and 120 are also shown and represent the various sensors disclosed and discussed above. Each of the VFDs 106 and 108, the actuators 110 and 112, and the sensors 114, 116, 118 and 120 are connected to a control unit 122 by way of electrical wiring 124 such as a dedicated harness. Alternatively, the electrical wiring could be a common bus such as in a controller area network. The control unit 122 receives signals from the various sensors 114, 116, 118, and 120, processes the information it receives, and then sends out command signals to the VFDs 106 and 108 and the actuators 110 and 112. The VFDs 106 and 108 then interpret the command signals and send corresponding drive signals to the fans 102 and 104, respectively. In the above described embodiment, a drive signal includes a signal from a power supply having an appropriately modulated frequency.

Through proper programming of either control unit 122, VFDs 106 and 108, or both, maximum speed settings may be established for the fans 102 and 104. Likewise, minimum speed settings may be set. Furthermore, parameter set points may be established for the overall operation and logic of the system. For example, a temperature value at which the storage bin is to be maintained may be defined. Having a defined temperature value and sensing air temperature at various points in the stream of air flow, the system will operate to adjust fan speed and/or adjust the mix of air flow to alter an existing environmental parameter. The logic of controlling the environment with such a system will be discussed in greater detail below.

It is noted that with such a system, greater flexibility is realized through the use of variable-speed drives. By using VFDs or some other variable-speed drive, more gradual changes to the environment may be achieved. The possibility of reduced power consumption is also seen in the practice of the present technique. This is because the relationship between power consumption and fan speed is nonlinear. For example, it has been established that in a system similar to that described herein, a twenty percent reduction in fan speed results in a fifty percent reduction in power consumption. Knowing that the rate of air flow varies linearly with fan speed, a simple calculation may be performed to compare air flow and power consumption for a system operating at full speed with a system operating at a reduced fan speed of eighty percent. A system operating at full power may circulate air, for example, at 100,000 cfm (cubic feet per minute). This system will circulate 6,000,000 cubic feet of air in a given hour. The reduced-speed system, however, will circulate air at a rate of 80,000 cfm requiring an hour and fifteen minutes to circulate 6,000,000 cubic feet of air. However, even with the additional fifteen minutes of operating time, the reduced-speed system only consumes sixty-two and a half percent as much power as the full-speed system. Indeed, operating the fan at even slower speeds nets even larger savings in power.

With reduced-fan speed consuming considerably less energy than does full-speed operation, a fan can be operated continuously to maintain the storage facility environment within a tightly defined parameter range. For example, if the storage facility is desired to be maintained at a temperature of 50° F., the fans can be operated continuously at a reduced speed to maintain the temperature within a few degrees. Furthermore, with proper fan speed control, in conjunction with proper inlet ventilation control, temperature can be maintained within a range of approximately 1° F. Thus, large temperature spikes may be eliminated from the storage environment with reduced power consumption.

It is noted that while the schematic of FIG. 4 shows a single control unit 122, it is possible that multiple controllers be employed in operation of the system 100. For example, the overall system 100 could be subdivided into subsystems wherein the main fan 102 and drive 106 were considered an individual subsystem. Similarly, the control of the auxiliary fan 104, drive 108 and auxiliary actuator may be taken together as a subsystem. Indeed, a subsystem may simply include a controlling actuator-associated main ventilation inlet.

Figure 5:
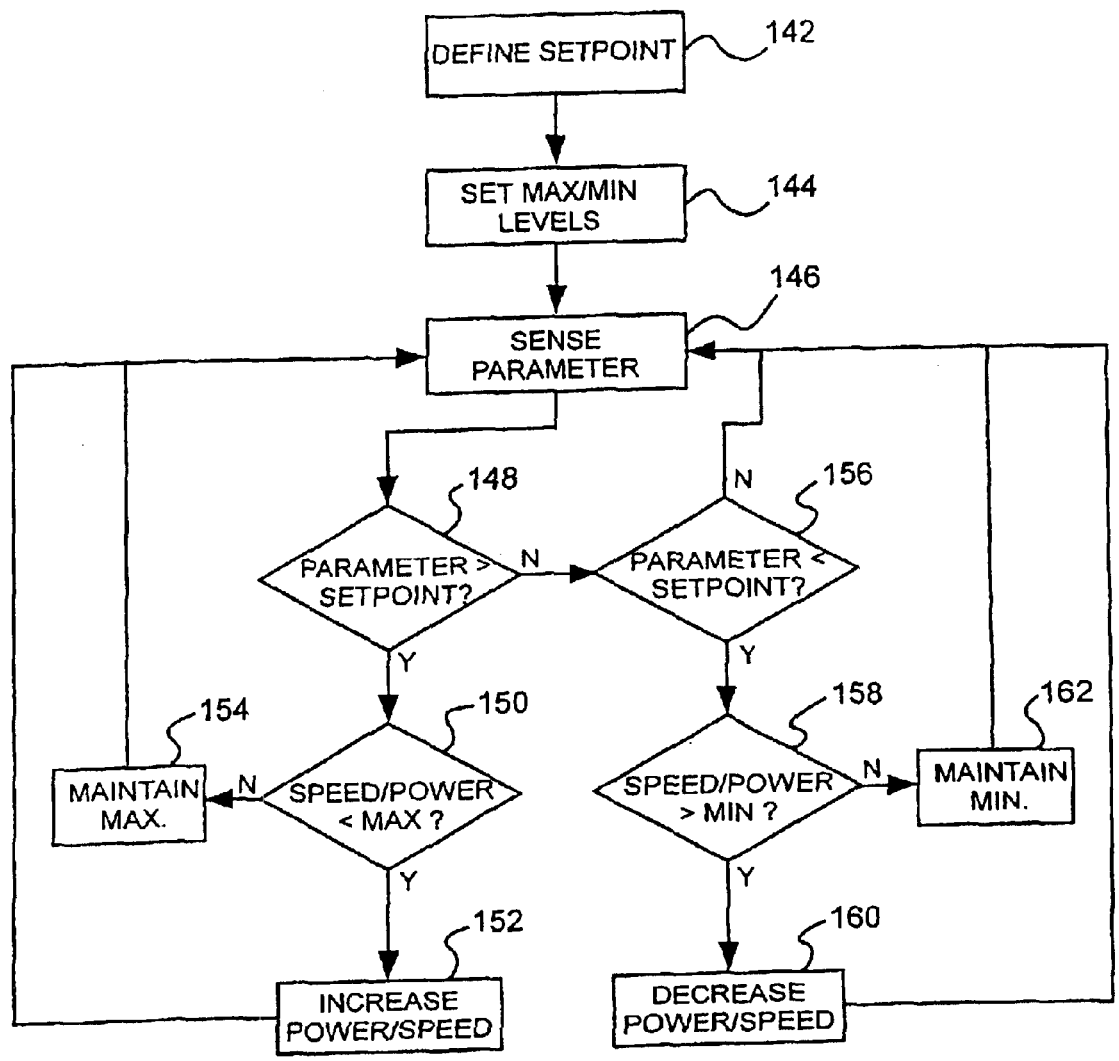
FIG. 5 is a block diagram illustrative of the logic employed in one embodiment of the invention.

Turning now to FIG. 5, and with reference to FIG. 4, the logic employed according to one aspect of the present technique is discussed. First, a parameter set point 142 is defined. The parameter set point is the value at which the storage facility environment should be maintained. For example, it may be a value concerning temperature, humidity, $CO_2$ or some other environmental parameter. For sake of clarity, and not by way of limitation, the use of temperature will be maintained as the specific environmental parameter throughout the following discussion.

Maximum and minimum fan speeds are defined, as shown at step 144, and are programmed into either the control unit 122 or the VFD 106 (illustrated in FIG. 4). Alternatively, maximum and minimum power consumption rates may be defined for the fans. An environmental parameter is then sensed 146 and an appropriate data signal is communicated to the control unit 122. The control unit 122 then determines if the sensed temperature is greater than the defined set point as indicated at 148. If the result is affirmative, then the control unit 122 determines whether the current fan speed is less than the defined maximum as shown at step 150. If this inquiry is affirmative, then the control unit 122 will increase the speed of the fan 102 as indicated at step 152. Following the increase of fan speed, the temperature is again sensed as shown at step 146, with the process ready to repeat itself. If the inquiry at step 154 is answered negatively, then the fan speed is maintained at the maximum speed and the process returns to step 146.

If, however, the inquiry at 148 yields a negative response, the control unit 122 then will inquire whether the sensed temperature is less than the defined set point as shown at 156. If the result is affirmative, a second inquiry is made as to whether the fan speed is greater than the minimum setting as indicated at step 158. If the result to this inquiry is affirmative, then the fan speed is reduced as shown at 160, and the process returns to step 146. If the inquiry at step 158 yields a negative response, then the fan speed is maintained at the minimum speed as shown at 162, and the process returns to step 146. Finally, if the inquiry at step 156 yields a negative result, the process likewise returns to step 146.

Thus, using the logic described above, the fan is operated continuously and, if the maximum setting is less than full power, it is operated continuously at a reduced speed. In the example above, the present technique allows for the continuous control of fan speed to maintain the storage facility environment at a defined temperature. It is noted that the chosen parameter need not be temperature. It is also noted that the above logic is in reference solely to fan speed and that the control unit may contemporaneously control the ventilation inlet 26 (shown in FIGS. 1 and 2) to influence the environment as well. Additionally, it is noted that, in certain circumstances, fan speed may be decreased if the sensed parameter is greater than the defined set point and increased if the sensed parameter is less than the defined set point. The fan speed may also be increased or decreased in response to the deviation of the sensed parameter from the set point or the difference between two sensed parameters.

Figure 6:
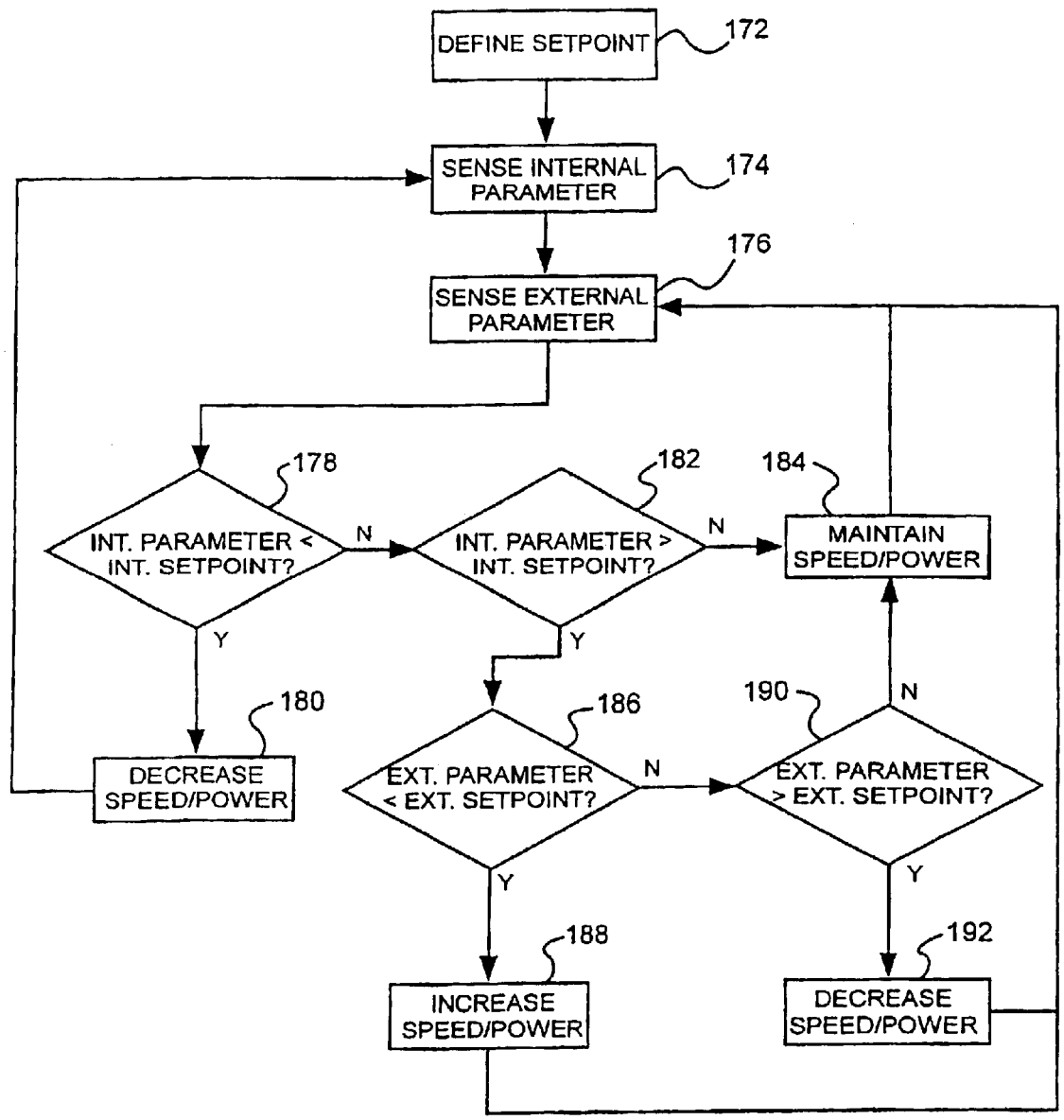
FIG. 6 is a block diagram illustrative of the logic implemented according to another embodiment of the invention.

Turning now to FIG. 6 and referring to FIG. 4, the operational logic regarding the operation of the auxiliary system of FIG. 3 is described. First, parameter set points are defined as shown at step 172. Both an internal set point and an external set point are defined. The internal set point is a parameter value at which the storage facility environment should be maintained. For example, it may be a value concerning temperature, humidity, $CO_2$ or some other environmental parameter. For sake of clarity, the following example will focus on the control of $CO_2$ as the internal parameter to be maintained. The external set point is a parameter value which is used to override the system in specific instances. For this discussion, the external set point is defined in terms of temperature.

While not shown specifically in FIG. 6, maximum and minimum fan speeds may be defined according to the description in reference to FIG. 5. An internal environmental parameter is then sensed as shown at step 174, and an appropriate data signal is communicated to the control unit 122. Again, for this discussion the sensed internal parameter will be the $CO_2$ level in the storage facility. An external parameter is also sensed as shown at 176. For this discussion, the external parameter will be the ambient temperature outside the storage facility. The control unit 122 then determines if the sensed $CO_2$ is less than the defined set point as indicated at 178. If the result is affirmative, then the control unit 122 will decrease the speed of the auxiliary fan 104 as indicated at 180. Following the decrease in fan speed, the process returns to step 174. If the inquiry at step 178 is answered negatively, then the control unit 122 determines whether the sensed $CO_2$ level is greater than the defined level as indicated at 182. If the result is negative, then the speed is maintained as shown at 184, and the process returns to step 176. If, however, the result is affirmative, the control unit 122 further determines if the external temperature is less than the external set point as seen at step 186. If the result to the inquiry at 186 is affirmative, then the fan speed is increased as shown at step 188 and the process returns to step 176. If the result to the inquiry at 186 is negative, the control unit 122 determines whether the sensed external temperature is greater than the external set point as shown at step 190. Again, if the result to this inquiry is negative, then the fan speed is maintained as shown at step 184, and the process returns to step 176. If, however, the result to the inquiry at step 190 is affirmative, then the fan speed is decreased as shown at step 192 and the process returns to step 176.

Thus, the inquiries shown at steps 186 and 190 work as a check on the external environment. This allows an override function to be in place such that the admittance of external air by the auxiliary system does not interfere with the maintenance of one or more other environmental values. For example, if the main fan 102 is being utilized to control temperature and the auxiliary fan 104 is being utilized to control $CO_2$, the use of external air to sweep out $CO_2$ may impair the system's ability to control temperature, depending on the temperature of the external air. Thus, the main fan 102 is given priority in the example above, such that control of temperature overrides the control of $CO_2$. Of course the main and auxiliary systems could each control parameters different than those attributed in the above example with similar logic employed and similar results achieved.

It should be understood that while the logic discussed in connection with FIGS. 5 and 6 related to a particular system, the logic may be applied to the other systems or subsystems disclosed herein. For example, the logic of FIG. 5 may be easily adapted for use with the auxiliary system if so desired. Similarly, the logic discussed in connection with FIG. 6 may equally be applied to operation of the main fan or possibly the control of the main ventilation inlet. It is noted that, as disclosed previously herein, the auxiliary fan may operate as the primary control of the internal environment if so desired.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, it is contemplated that while the embodiments and techniques described above have been shown to be combined into a single system, they may operate as individual systems or as subsystems. For example, what has been described as the auxiliary system, i.e., FIG. 3, need not be connected to the same control unit as the systems described in FIGS. 1 and 2. As noted above, multiple controllers may be employed to operate the system in a similar manner.

It is further contemplated that a single control unit may interact with individual components of the system on an independent basis. For example, FIG. 4 illustrates a system with a single control unit 122 networked with multiple components. Such a control unit 122 may be configured to receive information or data from a first sensor 114 and use that information to control the speed of the first fan 102. The control unit 122 may then receive a signal from a second sensor 116 for use in controlling the second fan 104. However, the first fan 102 may be operated at a speed independent of the speed of the second fan 104. Likewise, contemporaneous and independent control may be exerted over the ventilation inlets.

Of course, additional components may be introduced into the system for added control and benefit. Such components may include, by way of example, heating equipment, cooling equipment, humidifiers, dehumidifiers, actuated exhaust controls, or fogging equipment for the introduction of desired chemicals into the environment.

What is claimed is:

1. A method of controlling an internal environment of a storage facility, the method comprising:

providing at least one fan for inducing air movement within the storage facility;

continuously operating the at least one fan at less than full speed;

flowing air through the at least one fan, through an air plenum and into the storage facility;

sensing at least one environmental parameter within the air plenum; and varying speed of the at least one fan.

2. The method according to claim 1, wherein sensing the at least one environmental parameter within the air plenum includes sensing temperature.

3. The method according to claim 1, wherein sensing the at least one environmental parameter within the air plenum includes sensing humidity.

4. The method according to claim 1, further comprising sensing at least one environmental parameter within the storage facility and selecting a value at which the at least one environmental parameter within the storage facility should be maintained.

5. The method according to claim 4, further comprising varying the speed of the at least one fan according to a relationship between the least one environmental parameter within the air plenum and the at least one environment parameter within the storage facility.

6. The method according to claim 1, further comprising admitting external air into the internal environment and regulating flow of the external air in response to the at least one sensed environmental parameter within the air plenum.

7. The method according to claim 6, wherein regulating flow of the external air includes regulating the flow of the external air independent of the speed of the at least one fan.

8. The method according to claim 1, further comprising sensing at least one parameter of an environment external to the storage facility.

9. The method according to claim 8, further comprising varying the speed of the at least one fan according to the at least one sensed parameter of the environment external to the storage facility.

10. The method according to claim 8, wherein sensing the at least one parameter of the external environment includes sensing ambient temperature.

11. The method according to claim 8, wherein sensing the at least one parameter of the external environment includes sensing humidity.

12. The method according to claim 8, further comprising admitting external air into the internal environment and regulating flow of the external air in response to the at least one sensed parameter of the external environment.

13. A method of controlling an internal environment of a storage bin containing a mass of produce, the method comprising:
    flowing air through at least one fan, through at least one air plenum, through at least a portion of the mass of produce and into the storage bin so as to induce continuous air movement within the storage bin;
    providing at least a second fan for inducing introduction of external air into the storage bin;
    flowing air through the at least a second fan and out of the storage bin;
    sensing at least one environmental parameter within the storage bin; and
    varying speed of the at least a second fan.

14. The method according to claim 13, further comprising continuously operating the at least one fan at less than full speed.

15. The method according to claim 14, wherein sensing the at least one environmental parameter within the storage bin includes sensing a parameter selected from the group consisting of temperature, carbon dioxide, and humidity.

16. The method according to claim 14, further comprising selecting a value at which the at least one environmental parameter within the storage bin should be maintained and varying the speed of the at least a second fan according to a relationship between the at least one environmental parameter within the storage bin and a value at which the at least one environmental parameter within the storage bin should be maintained.

17. The method according to claim 14, further comprising inducing introduction of external air into the storage bin and regulating flow of the external air in response to the at least one sensed environmental parameter within the storage bin.

18. The method according to claim 14, further comprising sensing at least one parameter of an environment external to the storage bin and varying the speed of the at least a second fan according to the at least one sensed environmental parameter external to the storage bin.

19. The method according to claim 18, wherein sensing the at least one parameter of the external environment includes sensing ambient temperature.

20. The method according to claim 18, wherein sensing the at least one parameter of the external environment includes sensing humidity.

21. The method according to claim 18, further comprising admitting external air into the internal environment and regulating flow of the external air in response to the at least one sensed parameter of the environment external to the storage facility.

22. The method according to claim 14, further comprising selecting a maximum fan speed and a minimum fan speed wherein the maximum fan speed is a reduced fan speed, and continually operating the at least a second fan at a speed between the selected maximum and minimum fan speeds.

23. The method according to claim 14, further comprising selecting a maximum power level and a minimum power level for input to the at least one fan wherein the maximum power level is a reduced power level, and continually operating the at least a second fan at a speed between the selected maximum and minimum power levels.

24. A system for controlling an internal environment of a storage facility having an air plenum, the system comprising:
    at least one fan adapted to induce air movement through the air plenum and within the storage facility through continuous operation;
    at least a second fan adapted to induce introduction of external air to the storage facility;
    a variable-speed drive coupled to the at least a second fan, wherein the variable-speed drive provides a drive signal to the at least a second fan for controlling speed of the at least a second fan;
    at least one sensor adapted to determine at least one internal environmental parameter;
    at least one electrical control unit coupled to the at least one sensor and to the variable-speed drive, wherein the at least one electrical control unit receives a parameter signal indicative of the at least one internal environmental parameter from the at least one sensor and provides a command signal to the variable-speed drive based upon the parameter signal for varying an operational speed of the at least a second fan; and
    a ventilation inlet wherein air external to the storage facility is admitted into the internal environment.

25. The system of claim 24, wherein the at least one sensor includes at least a temperature sensor, a carbon dioxide sensor, or a humidity sensor.

26. The system of claim 24, further comprising at least one additional sensor adapted to determine at least one parameter of an environment external to the storage facility wherein the at least one additional sensor is coupled to the at least one electrical control unit and provides an external parameter signal to the at least one electrical control unit.

27. The system of claim 24, wherein the variable-speed drive is adapted to have a maximum speed setting and a minimum speed setting such that the at least a second fan is continuously running between the maximum and minimum speed settings.

28. The system of claim 24, further comprising at least another variable-speed drive coupled to the at least one fan, wherein the at least another variable-speed drive is configured to operate the at least one fan continuously at a reduced speed.

29. A method of controlling an internal environment of a storage bin, the method comprising:

providing at least one fan for inducing continuous air movement within the storage bin;

providing at least a second fan for inducing introduction of external air into the storage bin;

flowing air through the at least a second fan and out of the storage bin;

sensing at least one environmental parameter within the storage bin; and sensing at least one parameter of an environment external to the storage bin and varying the speed of the at least a second fan according to the at least one sensed environmental parameter external to the storage bin.

* * * * *

UNITED STATES PATENT AND TRADEMARK OFFICE
CERTIFICATE OF CORRECTION

PATENT NO. : 7,097,111 B2
APPLICATION NO. : 10/271824
DATED : August 29, 2006
INVENTOR(S) : William P. Riley and William P. Riley, II It is certified that error appears in the above-identified patent and that said Letters Patent is hereby corrected as shown below:

| | | |
|---|---|---|
| COLUMN 2, | LINE 63, | change "air flow" to --airflow-- |
| COLUMN 4, | LINE 40, | change "is open" to --is open,-- |
| COLUMN 4, | LINE 53, | change "produce pile is" to --produce pile 38 is-- |
| COLUMN 4, | LINE 56, | change "and back" to --and flow back-- |
| COLUMN 4, | LINE 67, | change "door is" to --ventilation inlet 26 is-- |
| COLUMN 5, | LINE 12, | change "air flow" to --airflow-- |
| COLUMN 5, | LINE 32, | change "storage bin, 20." to --storage bin 20.-- |
| COLUMN 5, | LINE 42, | change "chamber 16." to --main air duct 16.-- |
| COLUMN 5, | LINE 50, | change "Air flow" to --Airflow-- |
| COLUMN 5, | LINE 52, | change "produce pile as" to --produce pile 38 as-- |
| COLUMN 6, | LINE 3, | change "storage bin to" to --storage bin 20 to-- |
| COLUMN 6, | LINE 5, | change "vents 52 and 54," to --exhaust vent 52 and ventilation inlet 54,-- |
| COLUMN 6, | LINE 13, | change "parameters, for" to --parameters; for-- |
| COLUMN 6, | LINE 15, | change "inlet door 26" to --ventilation inlet 26-- |
| COLUMN 6, | LINE 28, | change "inlet 26" to --ventilation inlet 26-- |
| COLUMN 6, | LINE 48, | change "variable-speed drive 106" to --variable-frequency drive (VFD) 106-- |
| COLUMN 6, | LINE 57, | change "clutch causing" to --clutch, causing-- |
| COLUMN 6, | LINE 58, | change "slip" to --slippage-- |
| COLUMN 6, | LINE 59, | change "slip" to --slippage-- |
| COLUMN 7, | LINE 14, | change "120 are" to --120 is-- |
| COLUMN 7, | LINE 15, | change "represent" to --represents-- |
| COLUMN 7, | LINE 18, | change "are connected" to --is connected-- |
| COLUMN 7, | LINE 27, | change "above described" to --above-described-- |
| COLUMN 7, | LINE 38, | change "air flow," to --airflow,-- |
| COLUMN 7, | LINE 39, | change "air flow" to --airflow-- |
| COLUMN 7, | LINE 53, | change "air flow" to --airflow-- |
| COLUMN 7, | LINE 54, | change "a simple calculation" to --a calculation-- |
| COLUMN 7, | LINE 55, | change "air flow" to --airflow-- |
| COLUMN 7, | LINE 56, | change "full speed" to --full fan speed-- |
| COLUMN 7, | LINE 61, | change "cfm requiring" to --cfm, requiring-- |
| COLUMN 8, | LINE 17, | change "drive 106" to --VFD 106-- |
| COLUMN 8, | LINE 19, | change "drive 108" to --VFD 108-- |
| COLUMN 8, | LINE 49, | change "step 154" to --step 150-- |

UNITED STATES PATENT AND TRADEMARK OFFICE
CERTIFICATE OF CORRECTION

PATENT NO. : 7,097,111 B2
APPLICATION NO. : 10/271824
DATED : August 29, 2006
INVENTOR(S) : William P. Riley and William P. Riley, II It is certified that error appears in the above-identified patent and that said Letters Patent is hereby corrected as shown below:

COLUMN 8,   LINE 50,      change "maximum speed and" to --maximum speed 154 and--
    COLUMN 10,  LINE 5,       change "Of course the" to --Of course, the--
    COLUMN 10,  LINE 44,      change "the second fan 104." to --the speed of the second fan 104.--

In the claims:
CLAIM 5,   COLUMN 11,   LINE 14,     change "the least one" to --the at least one--

Signed and Sealed this

Thirteenth Day of November, 2007

JON W. DUDAS
*Director of the United States Patent and Trademark Office*